(12) United States Patent  
Mele

(10) Patent No.: US 8,779,620 B1  
(45) Date of Patent: Jul. 15, 2014

(54) ROTARY WINDMILL POWER GENERATOR

(71) Applicant: Joseph Mele, Oriental, NC (US)

(72) Inventor: Joseph Mele, Oriental, NC (US)

(*) Notice: Subject to any disclaimer, the term of this patent is extended or adjusted under 35 U.S.C. 154(b) by 0 days.

(21) Appl. No.: 13/955,907

(22) Filed: Jul. 31, 2013

(51) Int. Cl.
*F03D 9/00* (2006.01)
*H02P 9/04* (2006.01)
*F03D 3/00* (2006.01)

(52) U.S. Cl.
CPC ............... *F03D 3/005* (2013.01); *F03D 9/002* (2013.01)
USPC .................................................. 290/55

(58) Field of Classification Search
CPC ....... Y02E 10/728; Y02E 10/70; Y02E 10/00; Y02E 10/72; Y02E 10/721; Y02E 10/722; Y02E 10/723; Y02E 10/725; Y02E 10/74; F03D 3/005; F03D 9/002
USPC .......................................... 290/55, 54, 44, 43
See application file for complete search history.

(56) References Cited

U.S. PATENT DOCUMENTS

| 4,496,848 | A |  | 1/1985 | Binder |  |
| 4,547,125 | A |  | 10/1985 | McMahon, II |  |
| 4,770,020 | A | * | 9/1988 | Mele | 72/184 |
| 5,570,997 | A | * | 11/1996 | Pratt | 416/117 |
| 5,997,252 | A |  | 12/1999 | Miller |  |
| 6,682,302 | B2 | * | 1/2004 | Noble | 416/1 |
| 6,948,905 | B2 | * | 9/2005 | Horjus | 415/4.2 |
| 8,210,817 | B2 |  | 7/2012 | Iskrenovic |  |
| 2007/0077145 | A1 |  | 4/2007 | Kinkaid et al. |  |

FOREIGN PATENT DOCUMENTS

WO     WO 02/33253     4/2002

* cited by examiner

*Primary Examiner* — Javaid Nasri
(74) *Attorney, Agent, or Firm* — Baker Hostetler LLP

(57) ABSTRACT

The rotary windmill power generator comprises a rotatable member; a plurality of iso-grid panels interconnected in pairs, with each pair forming a panel assembly of two foldable iso-grid panels with one panel assembly connected to the rotatable member at a first end thereof and a corresponding panel assembly connected to the rotatable member at an end opposite the first end, a hollow upright tower; a turbine assembly assembly in engagement with said rotatable member for converting wind energy provided from each iso-grid panel assembly into electrical power and a drive gear assembly connected to each iso-grid panel assembly at each opposite end of the rotatable member for controlling the opening and closing of each iso-grid panel assembly relative one another in synchronism such that when one iso-grid panel assembly is open the opposite iso-grid panel assembly is closed and vice versa.

12 Claims, 7 Drawing Sheets

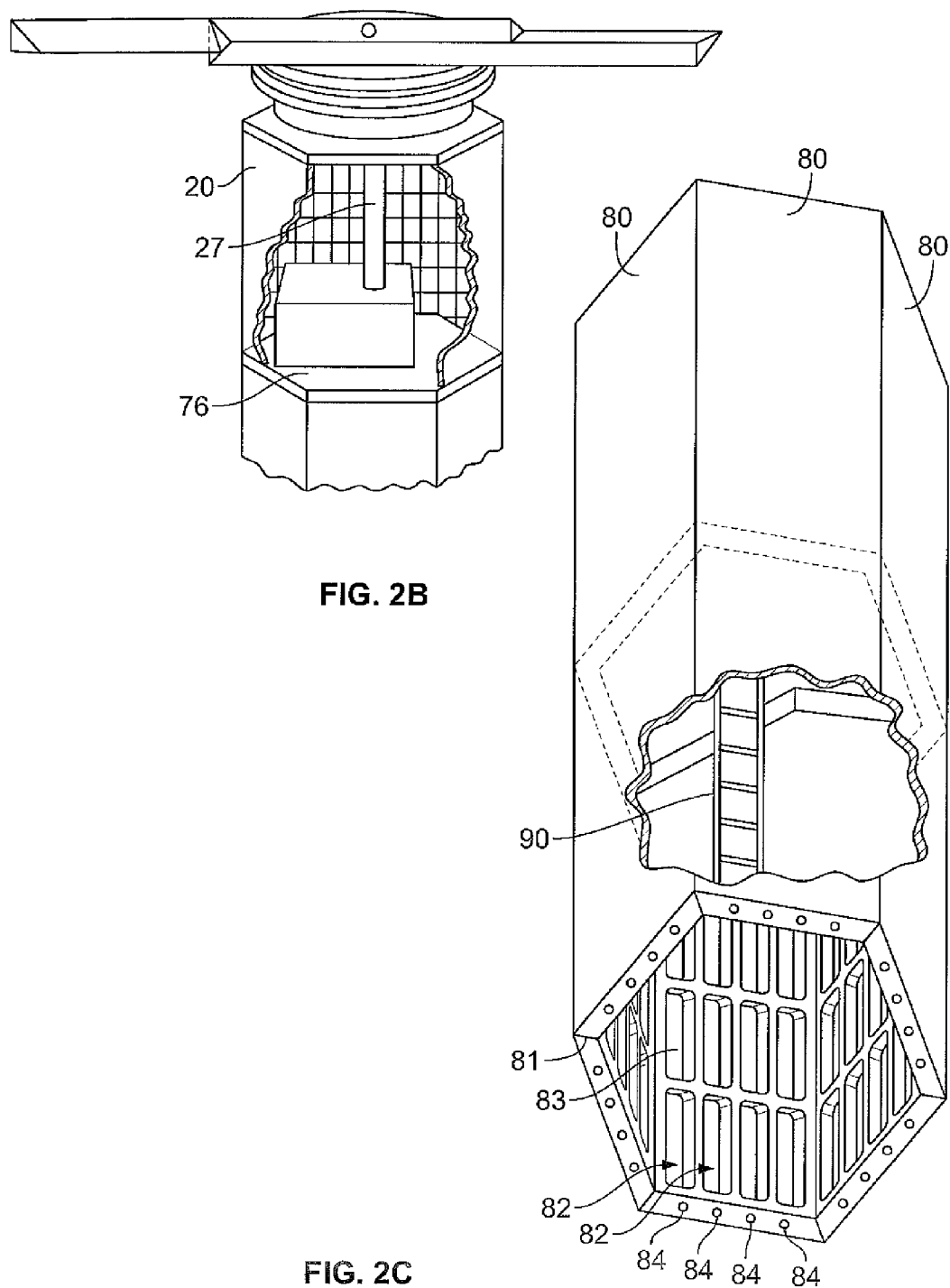

ROTARY WINDMILL POWER GENERATOR

FIELD OF THE INVENTION

The present invention relates to rotary windmill power generators or wind turbines used to produce electricity from wind power.

BACKGROUND OF THE INVENTION

Conventional rotary windmills possess a plurality of windmill propeller or turbine blades for rotation either in a vertical plane about a horizontal axis or in a horizontal plane about a vertical axis. The most common type of rotary windmill is commonly referred to as a vertical wind turbine system and employs three or more propeller blades mounted on a shaft extending from a complex tower vertically mounted at a height of 400 feet or more above ground level. The vertical wind turbine system is very expensive to construct, inefficient to operate, difficult and expensive to maintain, and has caused many environmental health hazards. The propeller blades are aerodynamic shaped with a typical blade length of up to 140 feet long and a weight of up to 6.5 tons. A turbine installation of this type requires an annual inspection in which the inspectors hang from cables to perform their inspection duties. Rotation of the blades is controlled from within the complex tower using an hydraulic assembly. During operation the blades are extremely noisy, dangerous to birds and prone to failure. Moreover, the efficiency of the conventional rotary windmill system, which is dependent upon using propeller or turbine type blades, is poor since the available surface area for converting incoming air, flowing past the propeller blades, into electricity is limited in comparison to the supply of available air. This results in high inefficiency which, in combination with the high cost of maintenance, has resulted in a substantial number of rotary windmill installations of this type to be abandoned.

Alternative windmill designs have been proposed to increase the efficiency of the windmill operation and to substantially reduce maintenance costs. Many alternate windmill designs employ variations of the conventional propeller type blades. One such design is taught in U.S. Pat. No. 5,570,997 in which aerodynamically shaped blades are assembled to form foldable pairs with each pair designed to operate as a clam shell. The aerodynamically shaped blades are balanced so that the air itself causes each foldable pair of blades, facing the wind, to fold open as the windmill rotates without requiring the use of any additional motorized mechanism. The foldable pairs of blades are arranged such that during each revolution of blade rotation only one pair of blades fold open while the other pair of foldable blades remain closed. Each foldable blade has a skeleton frame formed using supporting cross-bars covered with an aerodynamic foil of very thin material constructed of a light weight metal or composite having a contoured leading and trailing edge. The leading and trailing edges of the blades control the angle of the blades relative to the hydrodynamic flow of air or wind in an attempt to maximize the surface area of the one pair of open blades in contact with the wind.

Another alternative windmill design in taught in U.S. Pat. No. 6,948,905 representing a vertical axis wind turbine system employing a plurality of wind elements arranged in pairs with each pair extending from a shaft aligned along a vertical axis and spaced vertically apart from one another. Each wind element in each pair is in the shape of a cup, bowl or half barrel having a concave surface to catch the wind flowing at the concave surface side of the cup, bowl or half barrel and to exert greater resistance to wind flow as compared to the flow of wind on the opposite convex surface side of the wind element. The wind elements function as drive units supported in a frame to form a horizontal windmill which may be affixed to a building.

U.S. Pat. No. 6,682,302 teaches an alternative windmill employing a plurality of turbine blades arranged in foldable pairs which rotate in a horizontal plane above ground level. The system is designed to increase the efficiency of converting captured air into electrical power. Each foldable pair of turbine blades forms a clam shell design with each pair of foldable blades hinged together using an hydraulic assembly such that when one foldable pair of turbine blades is forced into an open position another pair of oppositely aligned foldable turbine blades is hydraulically forced into a closed position. Each foldable pair includes an upper and lower blade constructed from a thin foil of metal and has a curved shape.

BRIEF SUMMARY OF THE INVENTION

The windmill design of the subject invention does not use aerodynamically shaped propeller blades or turbine blades but, instead, employs a plurality of isogrid panels, arranged in pairs, with each panel in each pair having a multiplicity of deep pockets for capturing wind much more efficiently than is possible from propeller or turbine blades. Each panel has a relatively flat wall surface at one end thereof from which the multiplicity of deep pockets extend to the atmosphere with each pocket forming a pocket cavity of predetermined volume for converting captured air into electricity. The iso-grid panels are connected to a horizontally or vertically aligned shaft for circular rotation of the panels such that when incoming wind comes into contact with an iso-grid panel the entire volume in each pocket cavity is filled up with captured air for converting incoming air into electricity at a relatively high conversion efficiency as compared to the conversion efficiency using aerodynamically shaped propeller or turbine blades. Moreover, this increase in conversion efficiency is accomplished using iso-grid panels which are substantially smaller in dimension, from 40 to 70% smaller, compared to the dimensions of typical aerodynamically shaped propeller or turbine blades and need only stand at height above ground level which is below 50-60% of the vertical height requirement for typical aerodynamically shaped propeller or turbine blades relative to ground level. The size and height dimensions of the iso-grid panels substantially reduce the cost of fabrication and the cost of maintenance.

The rotary windmill power generator of the subject invention comprises: a rotatable member; a plurality of iso-grid panels interconnected in pairs, with each pair forming a panel assembly of two foldable iso-grid panels with one panel assembly connected to the rotatable member at a first end thereof and a corresponding panel assembly connected to the rotatable member at an end opposite the first end, a hollow upright tower; a turbine assembly disposed in the upright tower adjacent the uppermost end of the tower with the turbine assembly having a rotatable shaft in engagement with said rotatable member for converting energy from each iso-grid panel assembly into electrical power and a drive gear assembly connected to each iso-grid panel assembly for controlling the opening and closing of each iso-grid panel assembly relative one another in synchronism with the rotation of the rotatable member such that when one iso-grid panel assembly is open the opposite iso-grid panel assembly is closed and vice versa, wherein each iso-grid panel in each iso-grid panel assembly comprises; a substantially flat wall disposed at one end of the panel and a multiplicity of deep pockets in a honeycomb arrangement extending from the flat wall to the atmosphere with each pocket defining a cavity of predetermined dimension and volume.

Each of the iso-grid panels in each panel assembly is composed preferably of any metal and/or metal alloy composition. The motorized drive gear assembly for controlling the opening and closing of each panel assembly relative one another comprises; a first and second assembly of drive gears interconnecting each iso-grid panel in each iso-grid panel assembly for moving the iso-grid panels in each panel assembly toward and away from one another, a motor, a belt pully including additional gears for interconnecting the motor and the first and second assembly of drive gears for synchronously opening and closing each panel assembly as the rotatable member rotates such that when one iso-grid panel assembly is open the opposite iso-grid panel assembly is closed and vice versa. The drive gear assembly further comprises an electronic drive control for controlling the on and off operation of the motor and for providing the motor with a source of electrical power. The tower is preferably formed as a modular structure comprising a plurality of sections with each section defining a separate iso-grid structure composed of a metal or metal alloy with each of the sections interconnected to one another mechanically or bonded together metallurgically. The turbine assembly is mounted in the uppermost section of the tower and includes a rotatable shaft which extends through one end of the tower in engagement with the rotatable member for converting wind energy into electrical power.

BRIEF DESCRIPTION OF THE DRAWINGS

FIG. 2B is an enlarged perspective of the uppermost section of the support tower shown in FIG. 1 and FIG. 2A;

FIG. 2C is an enlarged perspective of an intermediate section of the tower shown in FIG. 2A between the uppermost section and other sections of the tower located below the intermediate section;

DETAILED DESCRIPTION OF THE INVENTION

Figure 1:
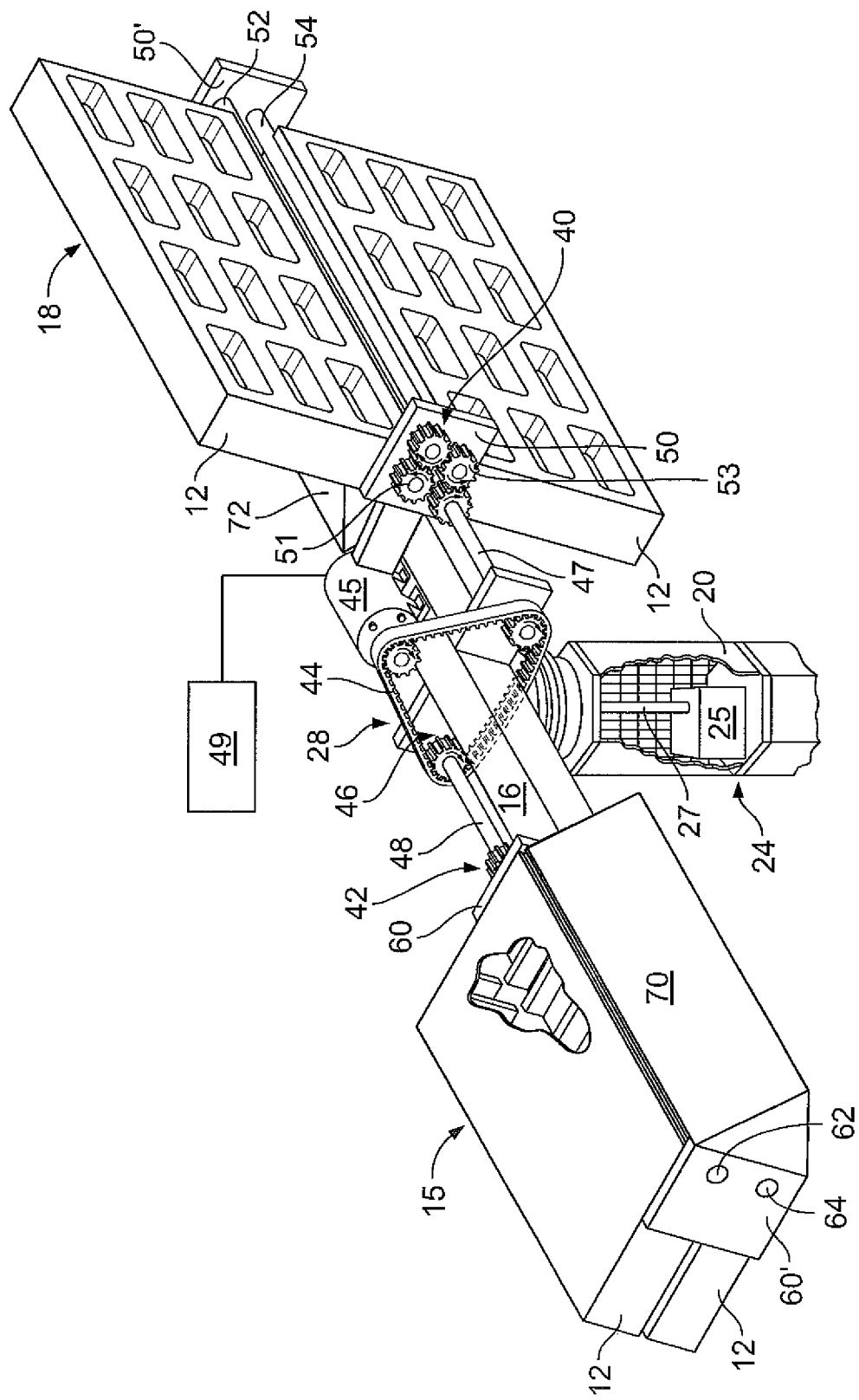
FIG. 1 is a perspective view of the rotary windmill generator of the present invention showing two pair of foldable iso-grid panels in combination with a partial view of the uppermost section of the support tower in which a turbine assembly is schematically illustrated connected to each iso-grid panel assembly for converting wind energy into electricity.

FIG. 1 shows the preferred embodiment of the windmill power generator 10 of the subject invention which comprises a plurality of iso-grid panels 12 arranged in pairs to form two foldable panel assemblies 15 and 18. Each panel assembly 15 and 18 is connected to a rotatable member 16 at opposite ends thereof. The two foldable panel assemblies 15 and 18 and the rotatable member 16 are supported by an upright tower 24 aligned transverse to the rotatable member 16 in a vertical plane relative to ground level. The upright tower 24 is preferably of hollow construction and includes a turbine assembly 25 mounted in the tower 24 preferably in its uppermost end or section 20 adjacent the rotatable member 16. The turbine assembly 25 is of conventional design and includes a rotatable shaft 27 which is connected to the rotatable beam 16 at a location between the plurality of foldable panel assemblies 15 and 18. The rotatable member 16 is driven in FIG. 1 by the panel assemblies 15 and 18 to rotate in a horizontal plane parallel to ground level.

One iso-grid panel assembly 15 is connected at one end of the rotatable beam 16 while the other iso-grid panel assembly 18 is connected at the opposite end of the rotatable beam 16 with each panel assembly 15 and 18 connected to a common drive gear assembly 28 in an arrangement which causes one iso-grid panel assembly 18 to open when the other iso-grid panel assembly 15 closes and vice versa in response to wind forces impacting the iso-grid panels of the open panel assembly. The turbine assembly 25 generates electrical power in a conventional manner in response to the rotation of the rotatable member 16.

Figure 3:
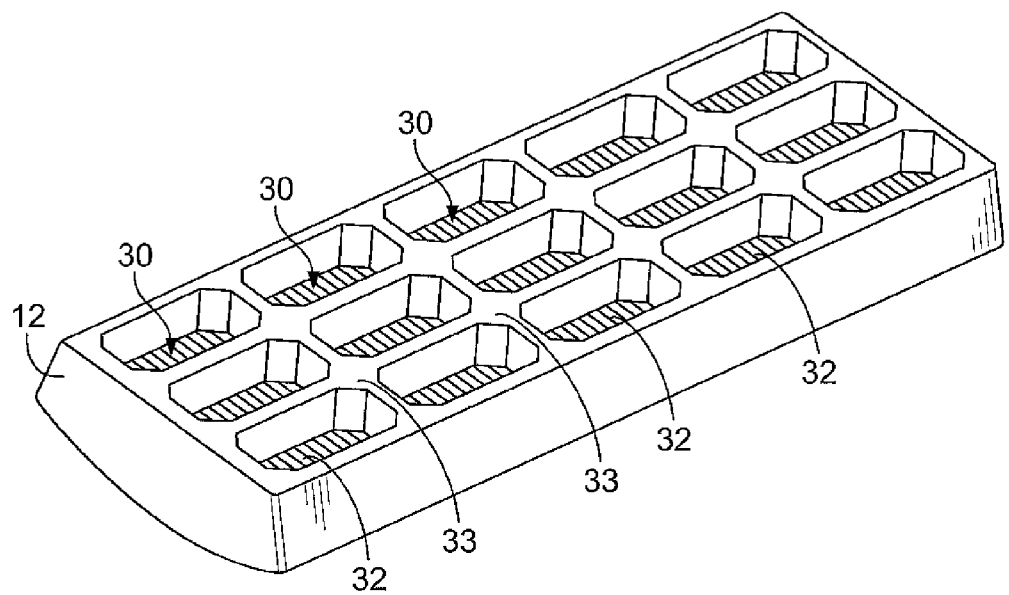
FIG. 3 is a perspective view of one iso-grid panel of an iso-grid panel assembly shown in FIG. 1 and FIG. 2A.

Each iso-grid panel 12, in each foldable panel assembly 15 and 18, is of identical construction, as is shown in FIG. 3, and may be fabricated by machining a solid slab of material composed of any metal or metal alloy composition into a panel having a substantially square or rectangular geometry and a multiplicity of deep pockets 30 extending from a relatively flat solid rear wall 32 on only one side of each panel 12 with the multiplicity of deep pockets 30 exposed to the atmosphere on the opposite side of the panel 12. Each pocket 30 defines a pocket cavity of a predetermined volume and size with the multiple pockets 30 located in close proximity to one another so as to minimize the amount of surface area 33 surrounding the pockets 30. This arrangement enables the multiple pockets 30, when disposed perpendicular to the direction of the wind, to capture essentially all of the moving air striking the panel 12 with very little loss attributable to air bouncing off the limited surface area 33 available surrounding the pockets 30. As additional air comes into contact with air already captured within the pocket cavities 30, the moving air will force captured air out from the pockets, displacing the captured air, and cause a rearward push on the panel 12 which adds to the directional motion of the panel 12. This is in sharp contrast to the operation of a conventional rotary windmill using propeller or turbine blades having flat blade surfaces. The wind impacts the flat surface of the blade dispersing the air in all directions to cause turbulence which results from interference between dispersed air and the incoming flow of moving air. Turbulence reduces the energy efficiency in the conversion of wind energy into electrical energy.

The iso-grid panels 12 absorb energy when the multiple deep pockets 30 momentarily capture air within its cavities. The flow of moving air in the direction of the panel 12 gradually displaces captured air from within its cavities. By minimizing the surface area 33 surrounding the pockets 30 turbulence can be avoided. The geometry of the cavity in each of the pockets 30 is important but not critical to the invention. Round cavities are less expensive to machine compared to other geometries but square or hexagonal shaped cavities are preferred and are believed to be somewhat more effective to minimize turbulence. For the preferred embodiment of FIG. 1 a rectangular shaped panel 12 is used with multiple deep pockets 30 preferably of hexagonal geometry.

Although the iso-grid panels 12 may be conventionally fabricated by a machining operation the preferred method to fabricate the panels 12 into single monolithic parts is "flow forging" as is taught and described in U.S. Pat. No. 4,770,020 the disclosure of which is incorporated herein by reference. U.S. Pat. No. 4,770,020 teaches a molding process for forging a solid panel from any metal material composition into a rigid iso-grid structure of any desired shape. In fact, U.S. Pat. No. 4,770,020 illustrates, in FIG. 17, the forming of a shaped part 14 having a multiple number of deep pockets in a configuration substantially conforming to the configuration of the iso-grid panels 12 in FIG. 3 of the subject invention except for the geometry of the cavities. The flow forging operation taught in the aforementioned patent enables the iso-grid panel structure 12 to be formed with multiple deep pockets 30 and having relatively thin ribs of metal of controlled thickness leaving each panel 12 with adequate structural strength while limiting the amount of surface area 33 surrounding the pockets 30.

Figure 4:
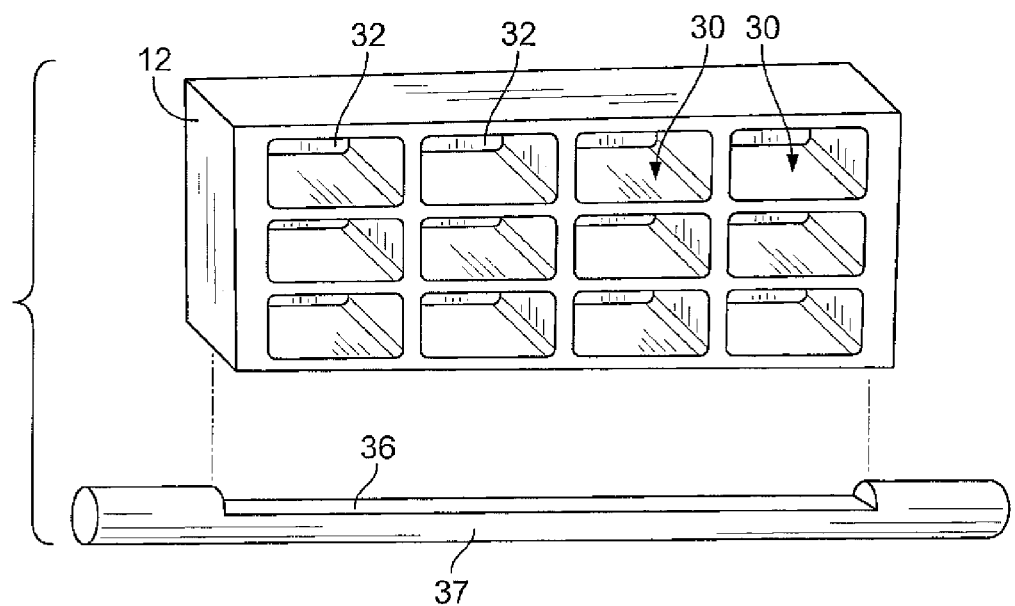
FIG. 4 is a perspective view of an alternate iso-grid panel design.
Figure 5:
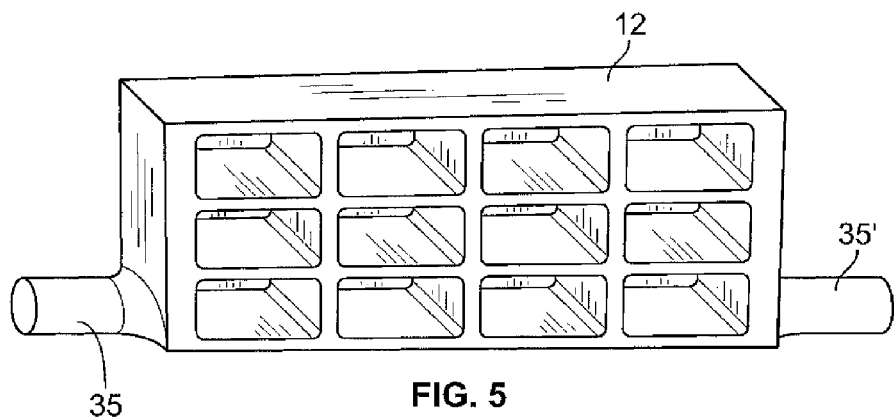
FIG. 5 is a perspective view of another alternate iso-grid panel design.
Figure 6:
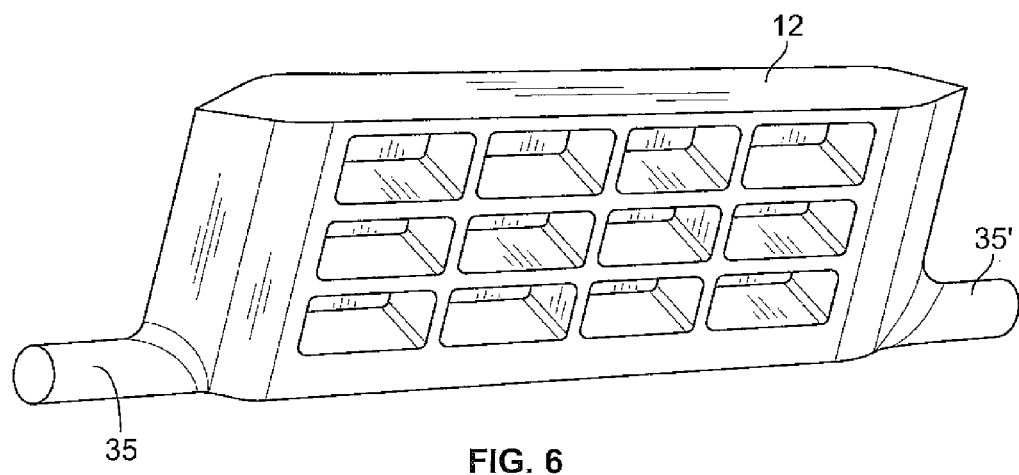
FIG. 6 is a perspective view of yet another alternate iso-grid panel design.

Each iso-grid panel 12 represents a unistructure body composed preferably of light weight metal and more preferably of aluminum or an alloy thereof. The body of the panel 12 may have a configuration forming any desired shape with the rectangular shape being preferred. Each iso-grid panel 12 may be integrally formed with a shaft 35 or with shafts 35 and 35' extending from opposite sides thereof as shown in FIGS. 5 and 6 to enable each iso-grid panel 12 to be readily connected to the drive gear assembly 28 to form the foldable panel assemblies 15 and 18. Alternatively, each iso-grid panel 12 may be mounted as shown in FIG. 4 upon a cut out section 36 of a separate shaft 37 for connection to the drive gear assembly 28. The iso-grid panel 12 shown in FIG. 6 is preferably fabricated with its ends 38 and 38' shaped at an inclined angle to contour the ends 38 and 38' of the iso-gird panel 12 for use in high winds.

Two iso-grid panels 12 are interconnected to the drive gear assembly 28 to form the foldable panel assemblies 15 and 18 on each opposite end of the rotatable member 16. The drive gear assembly 28 comprises a first set of drive gears 40 connected to the panel assembly 18 at one end of the rotatable member 16 and a second set of drive gears 42 is connected to the panel assembly 15 at the opposite end of the rotatable member 16. The drive gear assembly 28 further comprises a motor 45 and a belt drive 44 with the drive belt 44 connected to a third set of drive gears 46 which are interconnected through drive shafts 47 and 48 to said first and second set of drive gears 40 and 42. The motor 45 is also connected to an electronic motor drive 49 for activating the motor 45. The electronic motor drive 49 may be of conventional design for controlling the activating of the motor 45 in response to the direction of the wind and is adapted to apply a source of electrical power, not shown, to the motor 45.

The first set of drive gears 40 is mounted on a block 50 adjacent one side of each iso-grid panel 12 in the panel assembly 18 and includes a first drive gear 51 and shaft 52 extending through the block 50 to a corresponding block 50' adjacent the opposite side of each iso-grid panel 12 in the panel assembly 18. The first set of drive gears 40 also includes a second drive gear 53 and shaft 54 extending through the block 50 to the corresponding block 50'. The shafts 52 and 54 may correspond to shaft 37 having a cut out section 36 for attachment of each iso-grid panel 12 in the panel assembly 18 to each shaft 52 and 54 respectively or alternatively each of the shafts 52 and 54 may correspond to the shafts 35 and 35' as shown in FIGS. 5 and 6 and may be formed as an integral component in the fabrication of each iso-grid panel 12 for direct assembly to the drive gears 51 and 53. Likewise, the second set of drive gears 42 is mounted on a block 60 adjacent one side of each iso-grid panel 12 in the panel assembly 15. The second set of drive gears 42 includes an arrangement of drive gears equivalent to the gear assembly in the first set of drive gears 40 and has a first and second drive gear (not shown) connected to the shafts 62 and 64 extending between block 60 and the corresponding block 60' adjacent each iso-grid panel 12 on opposite sides of the panel assembly 15.

A first end block 70 interconnects block 60 and 60' and a second end block 72 interconnects block 50 and 50'. Each end block 70 and 72 forms a tapered body with a triangular shaped cross section for providing an aerodynamic surface so that air turbulence will not develop at the trailing end of the closed panel assembly during rotation of the rotatable member 16. The end blocks 70 and 72 extend between the two iso-grid panels 12 of each panel assembly 15 and 18 so that no clearance space exists for air to pass between the two iso-grid panels 12 of the panel assembly in the open position.

Figure 2A:
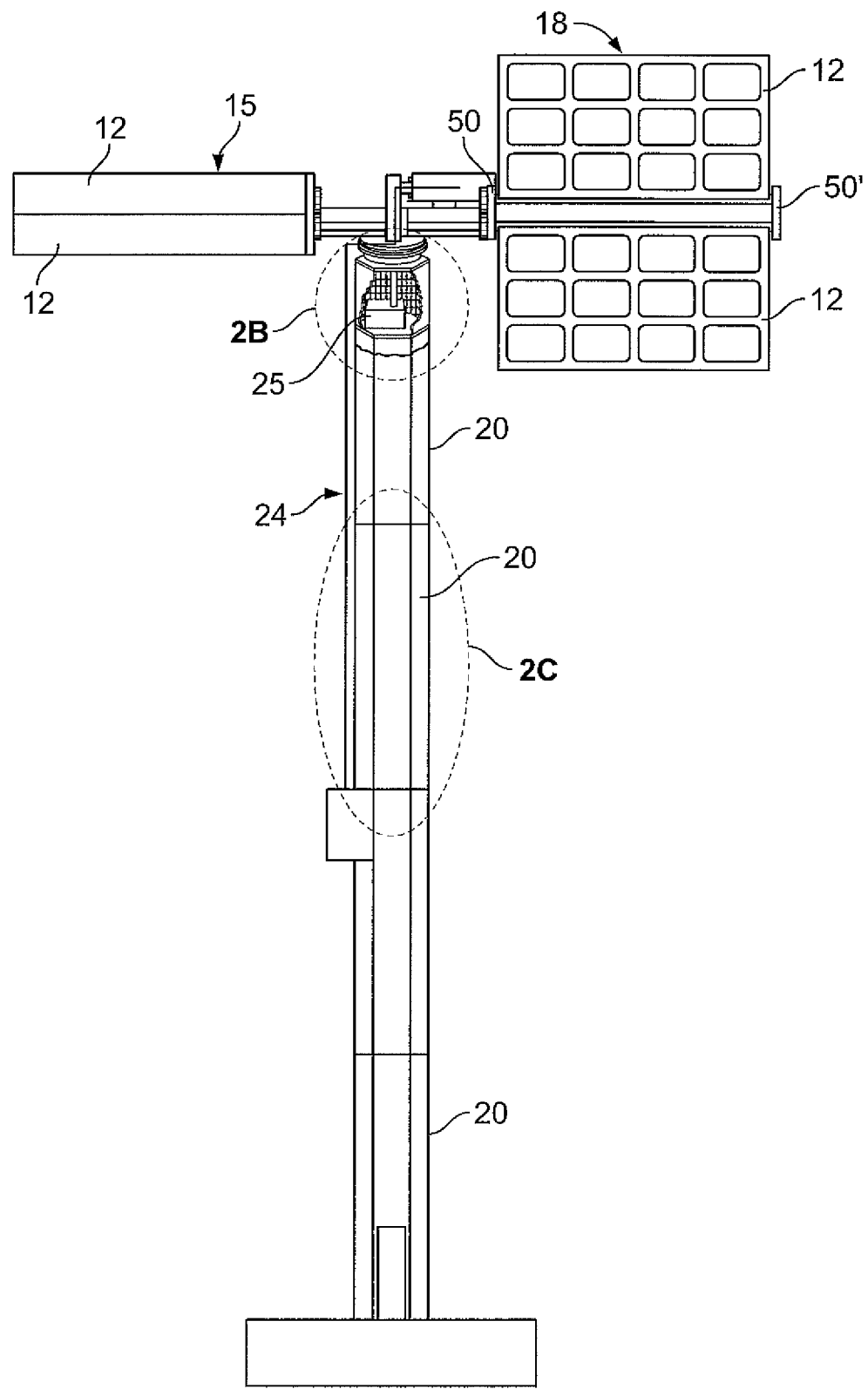
FIG. 2A is an elevational view of the rotary windmill generator shown in FIG. 1.

An elevational view of the rotary windmill generator of FIG. 1 is shown in FIG. 2A. The tower 24 stands upright in a vertical position supporting the rotatable beam 16 and panel assemblies 15 and 18 which rotate about the tower 24 in a substantial horizontal plane parallel to ground level. The tower 24 is hollow and may be fabricated in one piece or in sections. In the preferred embodiment of the subject invention the tower 24 comprises multiple modular sections 20 with the uppermost section 20 adjacent the rotatable member 16 preferably housing the turbine assembly 25 which is supported on a platform 76 as shown in FIG. 2B. The turbine assembly 25 has a rotatable shaft 27 which is connected to the rotatable beam 16 through a thrust bearing 77. The turbine assembly 25 is of conventional construction for converting wind energy into electrical energy.

The tower 24 is preferably composed of multiple sections 20 of substantially identical construction which are interconnected to one another mechanically or are metallurgically bonded by welding the opposite ends of the sections 20 to one another. Each section 20 of the tower 24 may be fabricated using any conventional method of fabrication inclusive of machining but is preferably constructed as an independent iso-grid structure using the same method of fabrication as used in the fabrication of the iso-grid panels 12 wherein each section 20 is formed as a hollow individual modular part in any desired shape. Although the geometrical shape of each section 20 can be of any shape such as square, rectangular or cylindrical, a hexagonal shape having six panels 80, as is shown in FIG. 2C, is, preferred. Each panel 80 is formed with a multiplicity of deep pockets 82 extending from an outer rear wall 83. The modular sections 20 and then assembled end to end in tandem to form the tower 24. If the geometry of the section 20 is cylindrical the panels 80 will be curvilinear in shape to form a round shaped modular section 20 resulting in a round shaped tower 24.

In the embodiment shown in FIG. 2C each of the six panels 80 is rectangular in geometry with tapered edges 81. A plurality of holes 84 may be drilled into opposite ends of each modular section 20 to enable the modular sections 20 to be mechanically attached to one another by bolting them together using screws (not shown). Alternatively the opposite ends of the modular sections 20 may be welding together. Each modular section 20 may be composed of a light weight metal or metal alloy composition, preferably of aluminum, so that the tower 24 will be strong and rigid but low in weight. This reduces the cost of manufacture and the cost of maintenance.

Each modular section 20 is hollow to facilitate access for maintenance from the lowermost section 20 of the tower 24 at ground level to the uppermost section 20 of the tower 24. A latter 90 may also be placed between the modular sections 20 to facilitate maintenance. Alternatively, or in addition, elevated equipment may be used during the construction of the tower 24 and incorporated within the hollow interior of the tower 24 to provide access to the turbine assembly 25, the drive gear assembly 28 and to each panel assembly 15 and 18 respectively for servicing.

Figure 7:
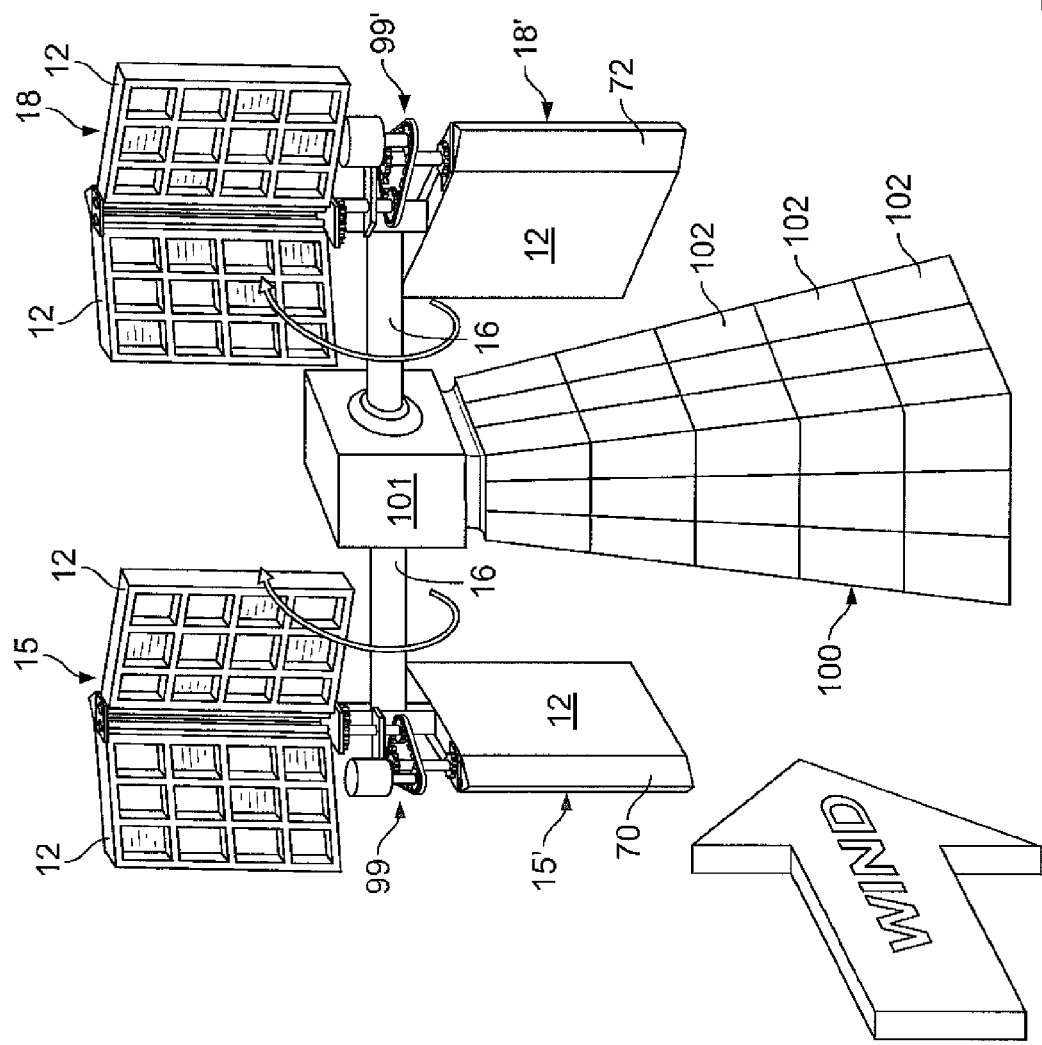
FIG. 7 is a perspective view of an alternate arrangement of the rotary windmill generator shown in FIG. 1 for rotating each of the panel assemblies in concert with the rotation of the rotatable member in a plane aligned with a vertical axis transverse to ground level.

The rotary windmill assembly of FIG. 1 is catergorized as a vertical rotary windmill system since each iso-grid panel assembly 15 and 18 rotates in common with the rotation of the rotatable member 16 in a horizontal plane parallel to ground level, as is apparent from FIGS. 1 and 2A. Alternatively, the same system can be configured to form a horizontal rotary windmill system with each iso-grid panel assembly 15 and 18 rotating in a vertical plane perpendicular to the longitudinal axis of the rotating beam 16. This is shown in FIG. 7 using the same reference numbers to identify corresponding components. However, in FIG. 7 there are two iso-grid panel assemblies 15, 15' located at one end of the rotating beam 16 and two iso-grid panel assemblies 18, 18' located at the opposite end of the rotating beam 16. Both panel assemblies 15, 15' and both panel assemblies 18, 18' rotate, as shown by the direction of the arrows, in a vertical plane transverse to ground level and to the longitudinal axis of the rotatable member 16. In this embodiment, the panel assemblies 15, 15' and 18, 18' are connected to the rotating member 16 through a drive gear assembly 99 and 99' which is equivalent to the corresponding drive gear assembly 28 in FIG. 1. However, in this embodiment the rotating member 16 is connected directly to each of the panel assemblies 15, 15' and 18, 18' on each opposite end thereof such that rotation of the panel assemblies 15, 15' and 18, 18' will rotate the rotating member 16 in a circular motion about its own longitudinal axis. The drive gear arrangement 99 and 99' controls the opening and closing of the iso-grid panels 12 of each iso-grid panel assembly 15, 15' and 18, 18' such that when one iso-grid panel assembly 15 is in the open position the two open iso-grid panels 12 face the wind. When the iso-grid panel assembly 15 is in the open position the corresponding iso-grid panel assembly 15' is in a closed position. In this embodiment the two iso-grid panel assemblies 18, 18' located at the opposite end of the rotating beam 16 operates in synchronism with each iso-grid panel assembly 15, 15' such that the iso-grid panel assembly 18 is open when the iso-grid panel assembly 15 is open with the open iso-grid panels 12 facing the wind and with the corresponding iso-grid panel assembly 18' in, a closed position.

The rotatable member 16 is also directly connected to a turbine assembly (not shown) in uppermost end of the tower 100. The turbine assembly in tower 100 is equivalent to the turbine assembly 25 in tower 24 in FIG. 1. Likewise, the tower 100 is substantially identical in construction other than its geometry to the corresponding tower 24 in FIGS. 1 and 2. In this embodiment of the invention as is shown in FIG. 7 the tower 100 is formed from modular sections 102 which are constructed similarly to the construction of the corresponding modular sections 20 of the tower 24 with each of the sections 102 except for the uppermost section 101, in which a turbine assembly is located, being substantially rectangular in shape but of different length and width so that the tower 100 when assembled will form a truncated pyramid as opposed to the hexagonal tower 24 shown in FIGS. 1 and 2.

Figure 8:
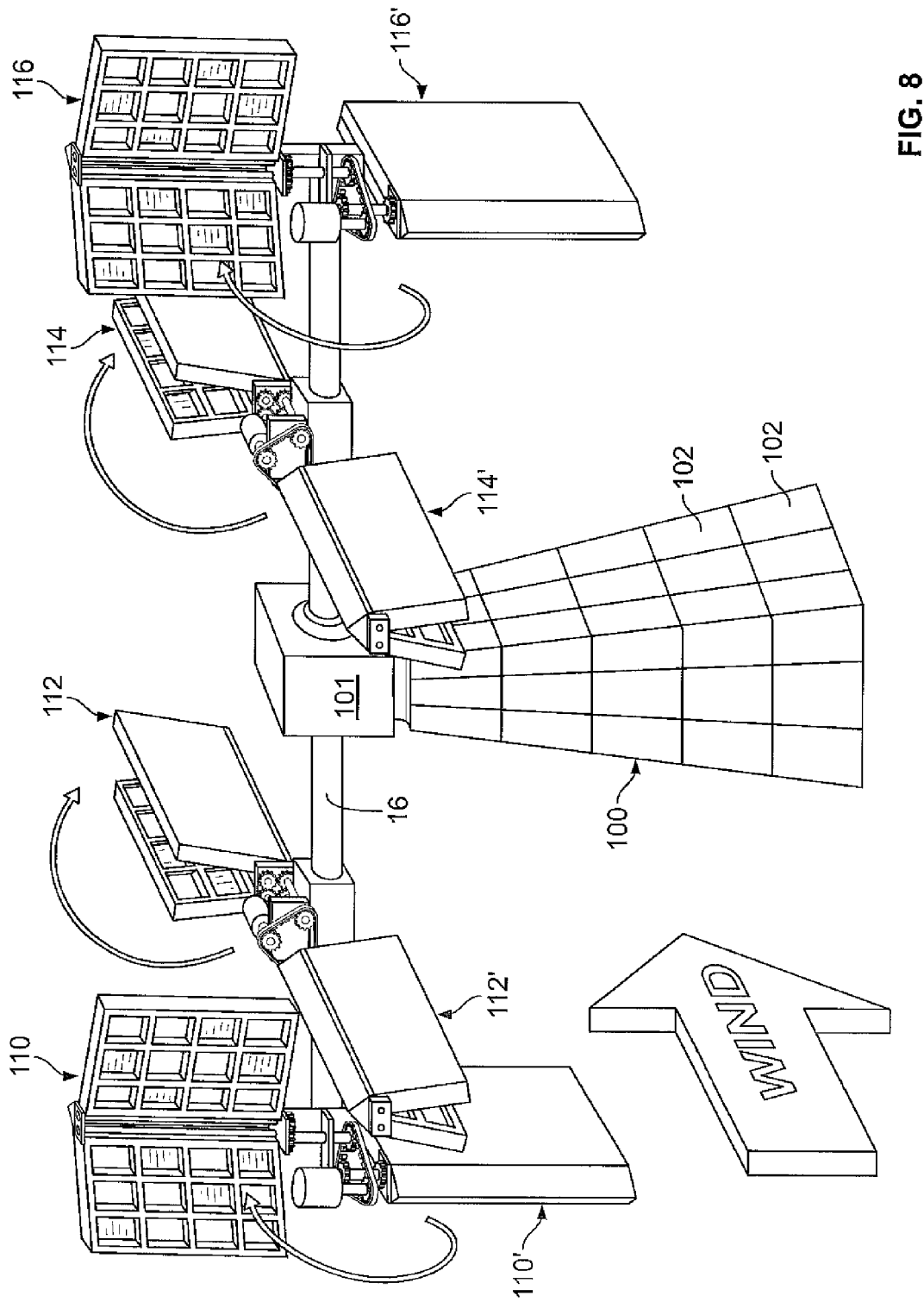
FIG. 8 is a perspective view of alternate variation of the rotary windmill generator shown in FIG. 7 having a plurality of iso-grid panel assemblies on each opposite end of the rotatable member with each of the panel assemblies on each corresponding end of the rotatable member being angularly spaced apart from each other.

An alternative vertical rotary windmill system to that of FIG. 7 is shown in FIG. 8. The only difference between the system of FIG. 7 and the system of FIG. 8 is the incorporation of two sets of iso-grid panel assemblies 110, 110' and 112, 112' on one end of the rotatable member 16 and two sets of iso-grid panel assemblies 114, 114' and 116,116' on an opposite end of the rotatable member 16. All of the iso-grid panel assemblies 110, 110' and 112,112' on one end of the rotatable member 16 and each of the iso-grid panel assemblies 114, 114' and 116,116' on the opposite end are each equivalent in construction to one another and to either of the iso-grid panel assemblies 15 and 18 in the embodiment of FIG. 1. However in this embodiment each of the iso-grid panel assemblies 110, 110' on one end of the rotatable member 16 are offset angularly, preferably by 90°, from the set of iso-grid panel assemblies 112, 112' on the same end of the rotatable member 16. Likewise the set of iso-grid panel assemblies 114, 114' are offset angularly and to the same extent, i.e., preferably by 90°, from the set of iso-grid panel assemblies 116, 116' to cause the iso-grid panel assemblies on each opposite end of the rotatable member 16 to open and close in synchronism. In the arrangement shown in FIG. 8 when the iso-grid panel assembly 110 is open the corresponding iso-grid panel assembly 110' is closed with the adjacent iso-grid panel assembly 112 only partially open and the corresponding iso-grid panel assembly 112' partially closed. Likewise the two sets of iso-grid panel assemblies 114,114' and 116,116' on the opposite end of the rotatable member 16 are arranged to open and close in synchronism with the iso-grid panel assemblies 110, 110' and 112,112'.

The invention claimed is:

1. A rotary windmill power generator comprising:
 a rotatable member;
 a plurality of iso-grid panels interconnected in pairs, with each pair forming a panel assembly of two foldable iso-grid panels with one panel assembly connected to the rotatable member at a first end thereof and a corresponding panel assembly connected to the rotatable member at another end thereof spaced apart from the first end;
 a hollow upright tower;
 a turbine assembly representing the power generator disposed in the upright tower adjacent an end of the tower nearest the plurality of iso-grid panels with the turbine assembly in engagement with said rotatable member for converting energy from each iso-grid panel assembly into electrical power and
 a drive gear assembly connected to each iso-grid panel assembly at each spaced apart end of the rotatable member for controlling an opening and closing of each iso-grid panel assembly relative one another in synchronism with the rotation of the rotatable member such that when one iso-grid panel assembly is open the opposite iso-grid panel assembly is closed and vice versa,
 wherein each iso-grid panel in each iso-grid panel assembly comprises; a multiplicity of deep pockets in a honeycomb arrangement with each pocket defining a cavity of predetermined dimension and volume for collecting wind.

2. A rotary windmill power generator as defined in claim 1 wherein each of said multiplicity of pockets has a cross sectional geometry selected from the group consisting of rectangular and hexagonal.

3. A rotary windmill power generator as defined in claim 2 wherein the drive gear assembly comprises a plurality of gears in an arrangement with a first set of gears connected to two iso-grid panel assemblies on a first end of said rotatable member and with a second set of gears connected to two iso-grid panel assemblies located on a second end of said rotatable member opposite said first end, a belt drive having a third set of gears connected to said first and second set of gears and an electronic motor drive comprising a motor with a shaft connected to said belt drive and an electrical control circuit for activating the motor in response to the direction of the wind.

4. A rotary windmill power generator as defined in claim 3 wherein each iso-grid panel in each iso-grid panel assembly is composed of light weight metal.

5. A rotary windmill power generator as defined in claim 4 wherein each iso-grid panel in each iso-grid panel assembly is composed of aluminum or an aluminum alloy.

6. A rotary windmill power generator as defined in claim 4 wherein said first set of gears comprises at least two gears for separately connecting each iso-grid panel in the iso-grid panel assembly on the first end of the rotatable member to said first set of gears and wherein said second set of gears comprises at least two gears for separately connecting each iso-grid panel in the iso-grid panel assembly on the second opposite end of the rotatable member to said second set of gears in an arrangement such that the two iso-grid panels in said panel assembly on the first end of the rotatable member will rotate toward each other to a closed position while the two iso-grid panels in the opposite panel assembly on the second opposite end of the rotatable member will rotate away from each other to an open position.

7. A rotary windmill power generator as defined in claim 6 wherein each iso-grid panel in each iso-grid panel assembly is formed as an integrated assembly with a shaft extending therefrom for connection to a separate drive gear in said drive gear assembly.

8. A rotary windmill power generator as defined in claim 6 further comprising a first mounting block affixed at opposite ends to the iso-grid panel assembly on the first end of the rotatable member to which said first set of gears is mounted and a second mounting block affixed at opposite ends to the iso-grid panel assembly on the second end of the rotatable member to which said second set of gears is mounted.

9. A rotary windmill power generator as defined in claim 8 further comprising an end block interconnecting each iso-grid panel in each iso-grid panel assembly on opposite ends of the rotatable member such that no wind passes between the two iso-grid panels of each iso-grid panel assembly when the iso-grid panels are open.

10. A rotary windmill power generator as defined in claim 6 wherein said hollow upright tower comprises a plurality of individual modular iso-grid sections with the turbine assembly disposed in the uppermost section of the tower closest to said two panel assemblies.

11. A rotary windmill power generator as defined in claim 6 wherein the two iso-grid panel assemblies at the first end of said rotatable member and the two iso-grid panel assemblies at the second end of said rotatable member opposite said first end are each connected to said rotatable member such that the rotatable member rotates in a horizontal plane relative to ground level in response to wind impacting the panel assembly in the open position.

12. A rotary windmill power generator as defined in claim 6 wherein wherein the two iso-grid panel assemblies at the first end of said rotatable member and the two iso-grid panel assemblies at the second end of said rotatable member opposite said first end are each affixed to said rotatable member in an arrangement such that each panel assembly rotates in a vertical plane transverse to ground level and said rotatable member is caused to rotate about an axis of rotation concentric with its longitudinal axis in response to wind impacting the panel assembly in the open position.

\* \* \* \* \*